W. C. WHITE.
AUTOMATIC TRAIN PIPE COUPLING.
APPLICATION FILED JUNE 25, 1912. RENEWED OCT. 28, 1915.

1,195,120.

Patented Aug. 15, 1916.
6 SHEETS—SHEET 1.

Fig. 1.

W. C. WHITE.
AUTOMATIC TRAIN PIPE COUPLING.
APPLICATION FILED JUNE 25, 1912. RENEWED OCT. 28, 1915.

1,195,120.

Patented Aug. 15, 1916.
6 SHEETS—SHEET 5.

W. C. WHITE.
AUTOMATIC TRAIN PIPE COUPLING.
APPLICATION FILED JUNE 25, 1912. RENEWED OCT. 28, 1915.

1,195,120.

Patented Aug. 15, 1916.
6 SHEETS—SHEET 6.

UNITED STATES PATENT OFFICE.

WALTER C. WHITE, OF LOS ANGELES, CALIFORNIA, ASSIGNOR TO INTERNATIONAL COUPLERS COMPANY, OF LOS ANGELES, CALIFORNIA, A CORPORATION OF CALIFORNIA.

AUTOMATIC TRAIN-PIPE COUPLING.

1,195,120.         Specification of Letters Patent.     Patented Aug. 15, 1916.

Application filed June 25, 1912, Serial No. 705,818. Renewed October 28, 1915. Serial No. 58,511.

*To all whom it may concern:*

Be it known that I, WALTER C. WHITE, citizen of the United States, residing at Los Angeles, in the county of Los Angeles and State of California, have invented certain new and useful Improvements in Automatic Train-Pipe Couplings, of which the following is a specification.

This invention relates to automatic train-pipe couplings, the objects of the present improvements being to simplify the construction and reduce the weight of the coupling head thereby lessening the cost of manufacture and maintenance; to reduce the space occupied by the pipe-coupling mechanism; to provide improved means for supporting the coupling whereby to more effectually accommodate variations in heights of cars being coupled; and to more efficiently hold the coupling heads in positive engagement to form a perfect joint between the train pipes and to maintain the same when rounding curves and at all other stages of the travel of the cars.

The invention also seeks to improve generally the construction and arrangement of the several parts of the apparatus, whereby durability and efficiency of the same will be increased, and the invention consists in certain novel features which will be hereinafter first fully described and then more particularly pointed out in the claims following the description.

The invention is fully illustrated in the accompanying drawings, in which:

Fig. 6 is an enlarged vertical section on the line 6—6 of Fig. 4.

My improved coupling head is preferably a single casting comprising a body 1 having a guide arm 2 projecting from one side, the said arm extending laterally from the side of the body and then forwardly therefrom and having its forwardly extended portion tapered, as shown at 3. An open space is thus provided between the guide arm 2 and the main portion of the body, in which space or chamber the body of the opposed engaging coupling head enters when the train pipes are coupled, and upon the side of the body distant from the said space or chamber, I form guides 4 which converge rearwardly and terminate adjacent the central horizontal plane of the head, as shown most clearly in Fig. 2, the said guides being engaged by the arm 2 when the heads are coupled, as shown in said figure. The guides 4 project forwardly and are flared somewhat to facilitate the entrance therebetween of the end of the arm 2, so that the coupling heads will be automatically brought into alinement when they occupy different horizontal planes. This frequently occurs in coupling a higher car to a lower one, and by my present construction I effectually accommodate a difference of four inches in the heights of the opposed heads. It will be readily seen that the tapered end 3 of the arm 2 will enter between the guides 4, and as the heads reach the coupled position the engagement of the said arm and said guides on the opposed heads will bring them into the same horizontal plane. The coupling heads are duplicates, so that an arm 2 on each head engages between guides 4 on the opposed head and consequently a force will be exerted on both sides of the coupling to bring the heads into alinement, and the body of one head will fit within the chamber formed in the other head between the body and the guide arm thereof, as will be readily understood. The guide arms will tend to bind between the converging guides 4, and to reduce the contacting surfaces so as to counteract this tendency I provide corrugations or ribs 5 on the upper and lower sides of the said arms which will bear against the inner faces of the guides, so that while a close engagement between the parts will be maintained, excessive binding will be prevented. When cars remain coupled for a considerable period, corrosion occurs to a very pronounced extent so that the coupling heads, as now generally constructed, resist attempts to uncouple them, but my construction avoids such extensive corrosion as will interfere with the operation of uncoupling the heads when it is desired to separate the cars.

Figure 4:
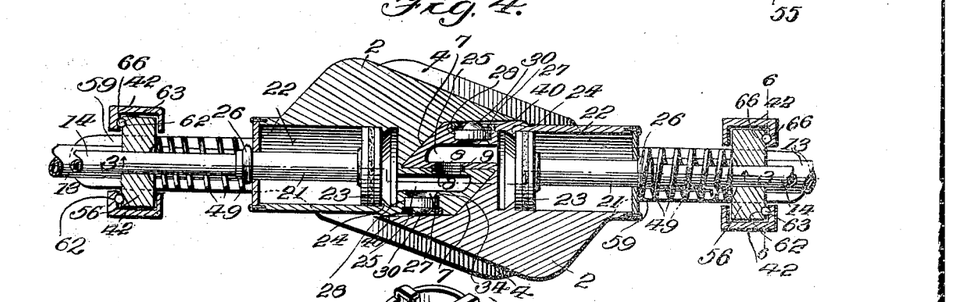
Fig. 4 is a horizontal section taken on the line 4—4 of Fig. 3, the broken line 3—3 in this figure indicating the plane of the section shown in Fig. 3.

In order to effectually provide for the proper lateral alinement of the engaging heads, the face of the head, between the body 1 and the arm 2, is formed with vertically spaced horizontal projections 6 having their front vertical faces inclined forwardly from the body to the guide arm and the front of the head is likewise beveled or inclined, as shown at 7, so that when the said inclined or beveled surfaces come together, as shown in Fig. 4, the heads will be deflected laterally to some extent, and the ports 8 therein will be caused to register perfectly. These ports are surrounded by elastic gaskets 9, and to prevent injury to the said gaskets when the heads are being engaged I provide the projections 10 at the front end of the body 1 of each head, the projections on the opposed heads engaging during the act of coupling and thereby deflecting the heads laterally to a slight degree, so that during the longitudinal movement of the heads the gaskets will be out of contact and consequently will remain uninjured. To accommodate said projections 10, after the heads are coupled, recesses 11 are provided at the junction of the arm 2 and the main portion of the body of the head to receive the said projections, as will be readily understood.

While my coupling may, of course, be utilized to connect only the ends of the train-pipe controlling the brakes, it will ordinarily be arranged to connect the ends of the signal pipe 12 and the steam pipe 13, as well as the brake pipe 14. The end of the steam pipe is fitted in a longitudinal passage 15 near the lower side of the coupler head, which passage extends directly into a chamber 16 which includes one of the lateral ports 8 opening through the inner side of the main body of the head. The end of the signal pipe 12 is fitted in a similar longitudinal passage 18 near the top of the coupler head and opening into a chamber 19 in the side of which is the uppermost port 8, the said pipes 12 and 13 having a telescopic connection with the passages in which they respectively fit, as shown at 20, to permit retraction of the head in coupling and to accommodate movement of the draw bar during travel of the cars.

Figure 3:
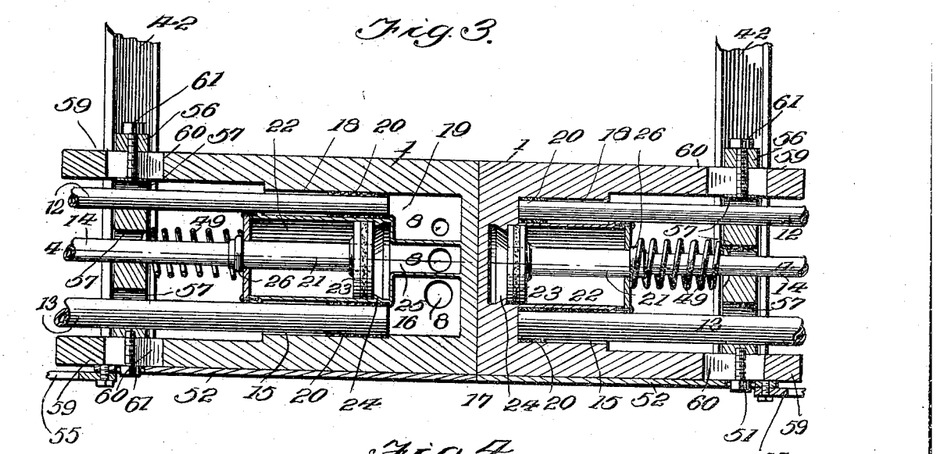
Fig. 3 is a vertical longitudinal section of two coupling heads coupled together.

The air-brake train-pipe opens into a hollow piston rod 21 which extends into a rear cylinder 22 formed on the coupling head, and a piston 23 is secured on or in the inner end of the said piston rod and plays within the said cylinder, as shown in Figs. 3 and 4, the forward movement of the piston being limited by an annular rib or shoulder 24 within the cylinder near the forward end of the same.

The front end of the cylinder 22 opens directly into a chamber 25 in the side of which the central port 8 is formed, as shown and as will be readily understood. Upon the hollow piston rod 21, near the rear end thereof, is an annular shoulder or stop 26 which is adapted to bear against the pipes carrier of the hanger. When the heads are coupled and air is turned into the train pipes, the air will expand between the piston 23 and the front end of the cylinder thereby forcing the piston outward so that the stop 26 will bear against the pipes carrier which then serves as an abutment causing the pressure in the cylinder to force the coupler head forward against the opposed head and maintain the registration of the ports.

The ports 8 in the sides of the chambers 19, 25, and 16 open through the inner face of the main body 1 of the coupling head, as shown and as will be readily understood, and the chamber 25, communicating with the cylinder 22, also has a port 27 in its outer side which communicates with a side cylinder 28 formed in the body of the head. In the said cylinder is mounted a floating piston 29 having a button or enlargement 30 on its outer side which normally projects slightly beyond the outer side of the head to be engaged by the inner side of the guide arm 2 of the opposed head. The outer end of the cylinder 28 is expanded slightly and threaded, as shown at 31, and in the said threaded expanded end of the cylinder I fit a threaded ring or collar 32 having inwardly extending lugs 33 which are adapted to be engaged by the outer end of the floating piston 29 to retain the said piston in the cylinder, as will be readily understood, the thickness of this ring or collar being such that the inner surface of the ring will lie flush with the inner surface of the cylinder and thereby permit free movement of the piston. The lugs 33 also constitute shoulders which may be engaged by a wrench or other tool when it is necessary to insert the collar into the cylinder or remove the same therefrom in assembling the parts or making repairs.

The inner end of the piston 29 bears against an annular shoulder 34 formed on the wall of the cylinder 28 adjacent the port 27, so that the pressure of the guide arm upon the outer end of the piston will force the heads laterally together and bring the ports into engagement. When air is admitted to the heads, it will expand against the inner ends of the pistons 29 and the guide arms will then constitute abutments so that the pressure will hold the heads firmly together and compress the gaskets to form air-tight joints.

It will be readily understood that the air is cut off when the heads are coming together, so that the guide arms 2 acting upon the main bodies of the opposed heads will effect a preliminary registration of the ports, and after this preliminary registration has been effected, the air is turned into the pipes by means of the angle cocks. When the air is admitted it will expand against the pistons 23 and 29, as described, so that relative movement of the coupling heads will be prevented and the ports cannot slip past each other when the cars are rounding curves, or are otherwise subjected to any force which might tend to throw them out of alinement.

It will be understood, of course, that the air from the air-brake pipe passes through a central opening in the piston 23 to reach the chamber 25 and the side cylinder, and when the air is cut off it will be drained from the said cylinders through the angle cocks 34' fitted in the pipes adjacent unions 35 which permit quick detachment and attachment of the hanger. When the air is cut off, any extreme thrust due to impact of the cars will be accommodated by the connection of the heads to the hangers presently described. In order to more completely effect a snug engagement of the lifting arm 2 with the side of the opposed coupling head, a slight projection 40 may be formed on the side of the head over which the guide-arm will ride, as indicated in Fig. 4, so that the heads will be drawn more closely into lateral engagement.

Figure 1:
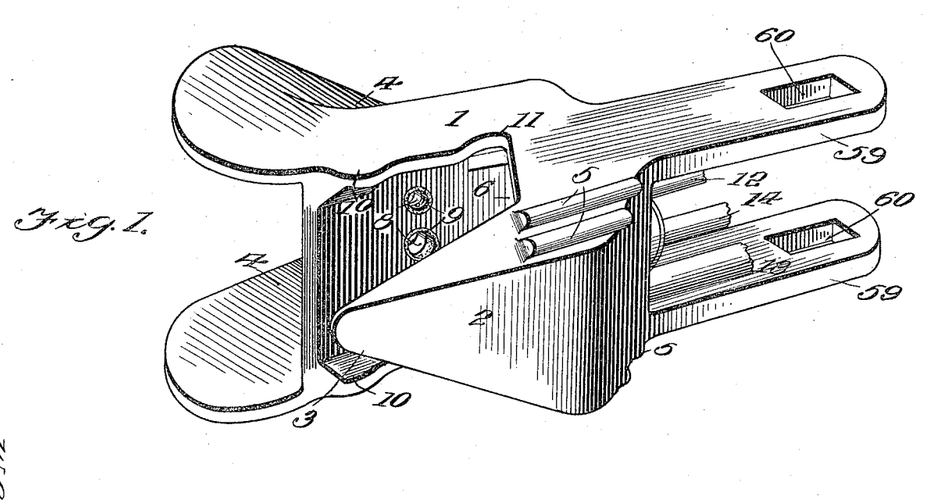
Figure 1 is a perspective view of one of the coupling heads.
Figure 2:
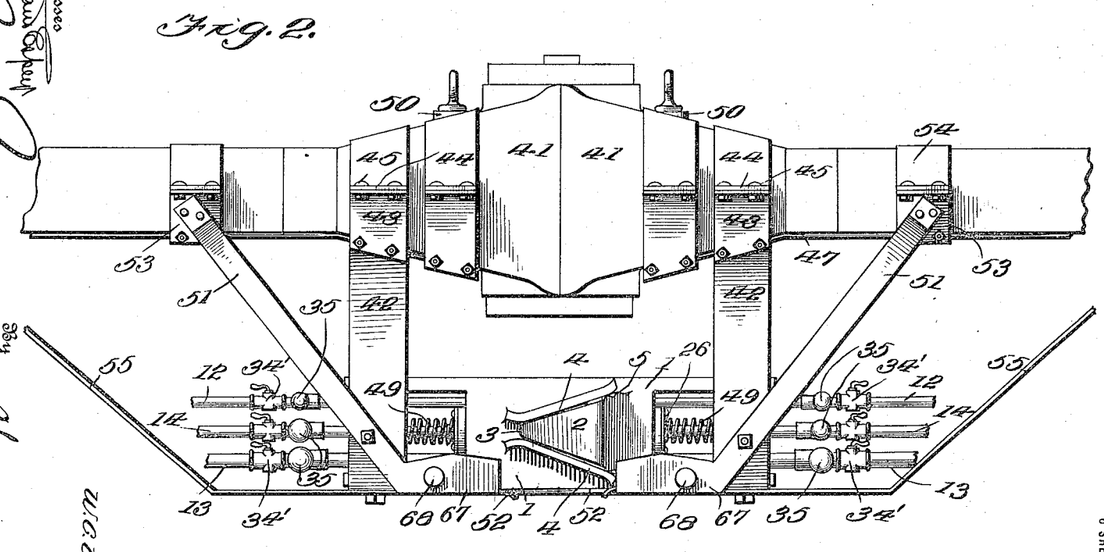
Fig. 2 is a side elevation showing two heads coupled together and illustrating the same supported from the car couplings.
Figures 5, 12:
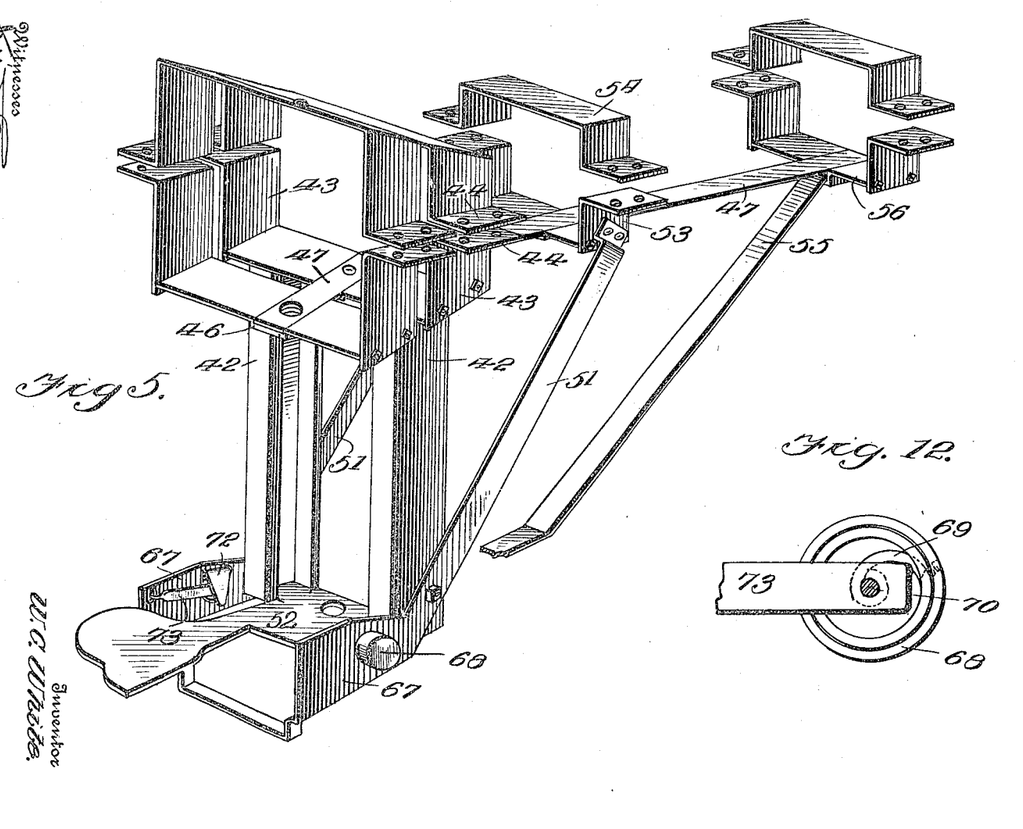
Fig. 5 is a perspective view of the hanger detached from the car coupling and from the train-pipe coupling.
Fig. 12 is an enlarged detail of a portion of the centering device.
Figures 7, 8:
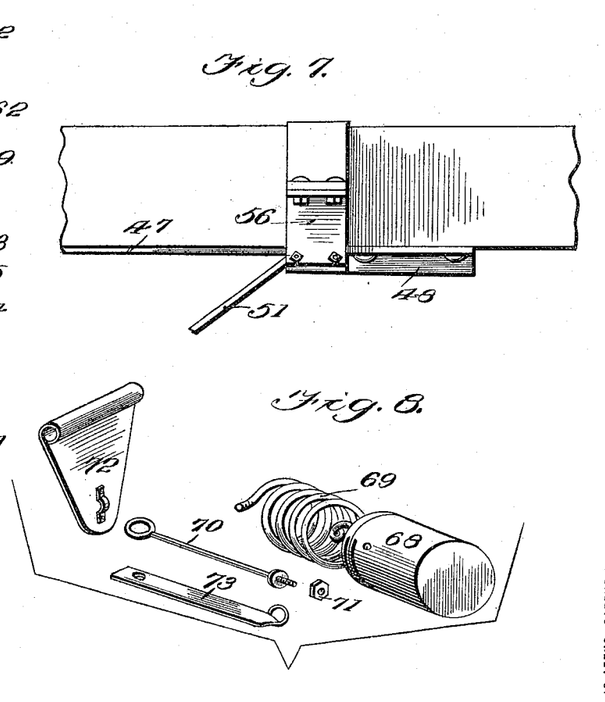
Fig. 7 is an enlarged detail view of a portion of the hanger.
Fig. 8 is a view in perspective showing the parts of a centering device which is mounted on the hanger, in their proper relative positions and separated.
Figure 9:
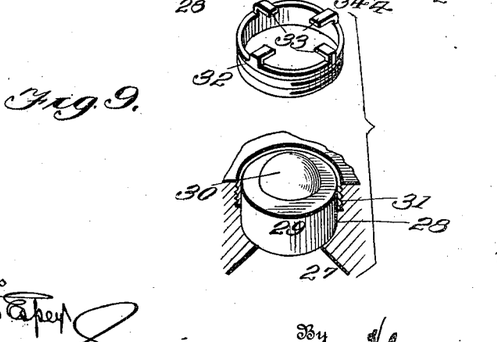
Fig. 9 is a detail sectional perspective of a part of the means employed to effect lateral contact between the engaging coupling heads.

The coupling heads are preferably supported from the car couplings 41, and to this end I employ a hanger shown in Figs. 2, 5, and 6. This hanger comprises side bars 42 which are bolted at their upper ends to head straps 43 passing around the car coupling drawhead, said head straps consisting of two members having flanges 44 at their ends through which securing bolts 45 are inserted, so that assembling of the parts upon the drawhead will be facilitated and slight differences in the shape or dimensions of the said head accommodated. The lower members of the head straps are adapted to fit against the bottom of the drawhead and are formed with a central groove or trough 46 to receive a longitudinal brace 47 securely fastened therein by bolts or rivets and extending rearwardly against the under side of the drawhead to bear against a rigid block or stop 48 usually found on the under side of the draw bar. This construction provides a very strong and rigid device to receive the end thrust, so that injury to any of the parts through the impact of the meeting heads and consequent derangement or failure of the heads to properly couple will be avoided. The buffer spring usually fitted back of the draw bar cushions the severe impact of the cars when the device is hung upon the car coupling, but when the pipe coupling is hung from the frame of the car, as hereinafter set forth, a buffer spring 49 is fitted around the pipe between the pipe coupler head and the pipe carrier.

By referring to Fig. 5 more particularly, it will be noted that the head straps form a hood or cage which encircles the drawhead of the car coupling and is provided on its upper side with a perforated boss 50 to receive the coupling pin. This construction provides an extended support around the drawhead, so that the hanger will possess sufficient strength to support the train-pipe couplings under all conditions.

Figures 10, 11, 13:
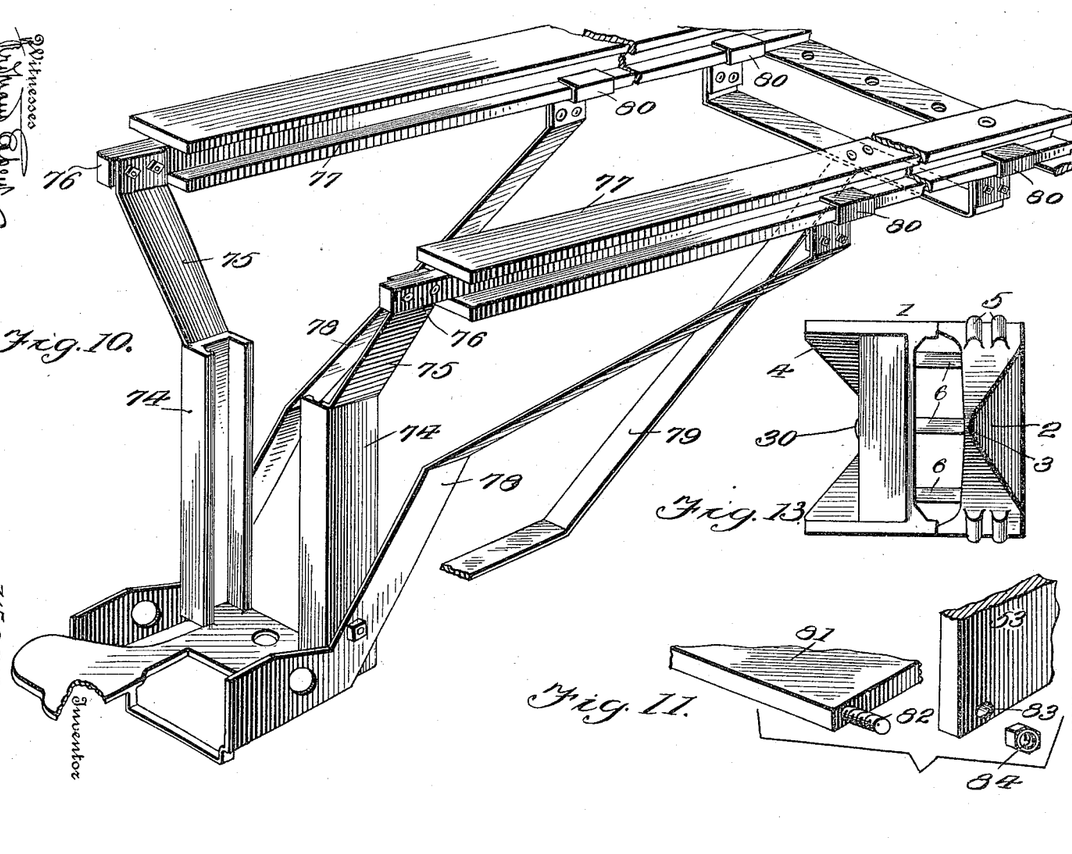
Fig. 10 is an enlarged perspective view of a modified hanger.
Fig. 11 is a view in perspective showing a portion of the hanger to illustrate the manner of securing the same.
Fig. 13 is a detail front elevation of the coupling head.

It will also be observed that I employ braces 51 which are secured to the side bars 42 and extend forwardly therefrom to support a shelf 52, shaped to accommodate the coupling heads, and also extend upwardly and rearwardly from the side bars to be secured to straps or plates 53 fitting against the bottom and sides of the draw bar and secured to a loop or similar plate or strap 54 passing over the draw bar. As shown in Fig. 11, the clamp members 53 are connected by a plate 81 provided at its ends with threaded studs or pins 82 adapted to extend through openings 83 in the clamp members and be engaged by nuts 84 which are turned home against said members. I also employ a central brace 55 having its front end secured to the shelf 52 and extending rearwardly and upwardly therefrom to be secured, together with the brace 47, in a clip 56 composed of members corresponding in number, construction and arrangement to the straps 53 and 54, the ends of the braces 47 and 55 abutting the ledge 48 now commonly provided on the bottom of the draw bar. The hanger thus described furnishes a very strong and firm support for the coupling heads and effectually resists any breaking strains imposed thereon by the impact of the coupling heads when the cars come together.

The train-pipes 12, 13, and 14 extend loosely through a carrier 56 which is slidably mounted in and extends between the side bars 42. The carrier is substantially an elongated block or plate having openings 57 therethrough to receive the train-pipes and provided near its upper and lower ends with slots 58 to receive the supporting arms 59 projecting from the coupling heads, said arms having longitudinal slots 60 near their extremities which receive the bolts 61 by which they are held in the carrier and which permit a limited longitudinal movement of the drawheads under the impact of the cars in coupling or under the pulling strain due to uncoupling. The carrier is mounted loosely in the side bars 42 and its lower end rests upon the shelf 52, so that the carrier will automatically accommodate itself to variations in the height of cars and the consequent vertical movement of the coupling heads. The carrier is provided with grooves 62 which receive antifriction balls or rollers 63, separated by spacers 64 and springs 65 and playing in the said grooves 62 and similar grooves 66 formed in the inner faces of the side bars 42, the said side bars 42 being preferably channel-irons, as shown clearly in Figs. 3 and 5.

The side braces 51 of the hanger are provided with enlargements 67 adjacent the shelf 52, and these enlargements are formed with threaded openings into which are screwed cylinders 68 having closed outer ends and which contain coiled springs 69. Each spring is attached at one end to the cylinder and at the opposite end to the outer end of a rod 70 by a nut 71 clamping it against a shoulder on the rod. The rod 70 extends through the enlargement 67 of the adjacent brace and has its end hinged to a presser plate 72 which is hung at its upper end upon the inner face of the enlargement and is normally held against the side of the coupling head. It will be readily understood that as the coupling head enters the hanger from an elevated position, the presser plate will yield and the increase in the tension of the spring will react to guide the head into a central position in the hanger. As the head sways or tends to swing to one side from any cause when uncoupled, the spring will automatically return the same to a central longitudinal position in the hanger, so that the head will always be in position to couple with an opposing head. To prevent the presser plates 72 being thrown to an inoperative position by the forward and backward movement of the coupling head against the same, I provide the keepers or straps 73 which are fitted at their upper ends to the enlargements 67 and at their lower ends to the lower ends of the presser plates.

I prefer to mount the hangers on the car couplings as shown in Fig. 2 and previously described, but it may sometimes be found desirable by reason of the limited space beneath the car or the nature of the equipment thereon, to secure the hanger directly upon the I-beams and cross beams of the car. In Fig. 10, I have illustrated such an arrangement, it being noted that the side bars of the hanger, indicated at 74, have diverging straps or brackets 75 at their upper ends which are provided at their upper extremities with openings adapted to register with similar openings in the extensions 76 of the longitudinal I-beams 77 of the car, the parts being secured together by suitable bolts inserted through the said registering openings. The side braces 78 and the central brace 79 of the hanger are extended upwardly and rearwardly and provided with clamping members or clips 80 adapted to be secured around the lower flanges of the I-beams 77. This hanger will operate in all respects in the same manner as the hanger shown in the other figures and previously described in detail, and either hanger may be used as circumstances may demand.

Ordinarily, I prefer to suspend the train-pipe coupling from the car-coupling, as a shorter cylinder may then be used and the backward thrust caused by the impact of the cars may be taken up by the springs of the draw bar and less travel required of the piston rod in the rear cylinder of the pipe coupler. The hanger herein disclosed is so constructed that it may be easily and quickly adjusted without mutilating or disturbing any other equipment of the cars, or requiring any great length of time in applying the same to the car, and slipping of the straps or members of the hanger is prevented, so that the pipe coupler heads will be quickly brought into proper engagement. By forming the rear cylinder and the side cylinder immediately upon or in the coupler head I reduce the size of the coupler head and consequently reduce the weight of the same, and by forming a small projection on the piston in the side cylinder to be engaged by the guide-arm of the opposed head I reduce the frictional contact to a minimum, so that the wear will be reduced without affecting the closeness of the joint between the ports of opposed heads or in any other way impairing the efficiency of the device.

The supporting arms extending rearwardly from the pipe coupler heads permit the said heads to yield to a limited extent in coupling and also permit the said heads to have some lateral movement relative to the hanger when the cars are passing around curves, and by forming the side and rear cylinders within the body of the head, I reduce the number of parts necessary to bring the heads into proper relative position, and also dispense with elements on the outer side of the coupling head which are liable to be damaged by contact with other parts of the car equipment and thereby render the device inoperative.

What I claim is:—

1. In a train-pipe coupling, the combination of a hanger, a pipe carrier slidably mounted in the said hanger, and a coupler head supported by the hanger and connected with the said pipe carrier.

2. In a train-pipe coupling, the combination of a hanger, a vertically movable carrier mounted therein, train-pipes loosely fitted in the said carrier, and a coupler head connected with said pipes and supported by the hanger and loosely connected with the carrier.

3. In a train-pipe coupling, the combination with a hanger, of a pipe carrier vertically movable therein, and a coupler head supported by the hanger and having a pin and slot connection with the carrier.

4. In a train-pipe coupler, the combination with a hanger, of a carrier vertically movable therein, a coupler head supported by the hanger and having rearwardly extending arms provided near their ends with longitudinal slots, and securing devices inserted through said slots into the carrier.

5. In a train-pipe coupling, the combination of a hanger comprising side bars having grooves in their inner faces, a carrier mounted between said side bars and provided with grooves co-acting with the grooves in the side bars, anti-friction devices fitted in said grooves, and a train-pipe coupler head supported by the hanger and loosely connected to the said carrier.

6. In a train-pipe coupling, the combination of a hanger comprising side bars having grooves in their inner faces, a carrier mounted between said side bars and provided with grooves co-acting with the grooves in the side bars, bearing balls running in said grooves, and a train-pipe coupler head supported by the hanger and loosely connected to the said carrier.

7. In a train-pipe coupling, the combination of a hanger comprising side bars, side braces secured to the said side bars, a shelf secured to the lower ends of said side braces and said side bars, a central brace extending upwardly and rearwardly from the said shelf, a carrier mounted in the side bars, a pipe coupler head adapted to rest upon the shelf and loosely connected with said carrier, and means for securing the upper ends of the side bars and the braces.

8. In a train-pipe coupling, the combination of securing plates adapted to pass around a car coupling, plates fitted between the lower ends of said securing plates and provided at their ends with threaded stems and having central longitudinal troughs, side bars and braces engaging the threaded stems, nuts on said stems to be turned home against said side bars, and a central longitudinal brace secured in the said troughs.

9. In a train-pipe coupling, the combination with a hanger, of a pipe coupler head resting loosely in the said hanger, centering devices mounted upon the sides of the hanger and adapted to bear against the sides of said head, and means for limiting the inward movement of the centering devices.

10. In a train-pipe coupling, the combination of a hanger, a pipe coupler head supported loosely thereby, presser plates pivotally hung at their upper ends upon the inner sides of the hanger, and means for yieldably holding said presser plates against the sides of the coupler head.

11. In a train-pipe coupling, the combination of a hanger, a pipe coupler head supported thereby, presser plates hung upon the hanger and adapted to press against the sides of the head, means for yieldably holding said plates against the sides of the coupler head, and keepers connecting the hanger and the presser plates.

12. In a train-pipe coupling, the combination of a hanger, a pipe coupler head supported loosely thereby, cylinders secured laterally in the sides of the hanger, springs secured at their outer ends within the cylinders, and presser plates hung at their upper ends on the hangers and having their lower ends connected with the outer ends of the springs.

13. In a metallic train-pipe coupling, a coupler head having a transverse cylinder within its outer side wall and a longitudinal cylinder in its rear wall, and means for applying fluid pressure through said cylinders to hold the head in engagement with an opposed head.

14. In a train-pipe coupling, a coupler head consisting of a body having a guide arm projecting laterally and forwardly from one side and having a transverse cylinder formed in its wall at the opposite side, a floating piston within said cylinder adapted to be engaged at its outer end by the guide arm of an opposed head to initially press the heads together laterally, and means within the head for admitting fluid pressure to the inner end of said piston whereby the heads will be held laterally in coupled relation.

15. In a train-pipe coupling, a coupler head formed interiorly with a longitudinally disposed cylinder at its rear end and with a transverse cylinder in its outer side wall in advance of said rear cylinder, pistons working in said cylinders, and means for admitting fluid pressure to both said pistons through the rear end of the head.

16. In a train-pipe coupling, a coupler head provided with lateral ports, fluid passages leading through the head to the upper and lower ports, a cylinder formed in the head between the said upper and lower fluid passages, a passage leading from said cylinder to the intermediate port, a piston working in said cylinder, and means whereby pressure exerted upon said piston will hold the coupler head longitudinally to an opposed coupler head.

17. In a train-pipe coupling, a coupler head provided with lateral ports, fluid passages extending through the head to communicate with the upper and lower ports, a fluid passage through the head communicating with the intermediate port, a transverse cylinder in the outer side wall of the head open at its inner end to said passage, and a piston within the said cylinder having its outer end arranged to bear against an inner face of an opposed coupler head and having its inner end exposed to the fluid in said passage through the head whereby the opposed heads will be held laterally in engagement solely by the pressure of said fluid.

18. The combination of a pipe carrier, a coupler head having a cylinder formed therein, a piston working in said cylinder, a piston rod extending from the piston, and a stop on said rod adapted to bear against the pipe carrier.

19. The combination of a coupler head having a cylinder formed therein and a stop in said cylinder, a piston in the cylinder, means for holding the piston initially against said stop, means for admitting pressure longitudinally through the cylinder and the piston to that face of the piston which bears against the stop to move the piston outwardly, and means for limiting the outward movement of the piston whereby the pressure upon the piston will hold opposed heads in engagement.

20. In a train-pipe coupling, a hanger comprising side bars and braces, a shelf carried by the lower ends of said side bars and braces, and projecting forwardly beyond the same, and means for securing the upper ends of said side bars and braces to a car.

In testimony whereof I affix my signature in presence of two witnesses.

WALTER C. WHITE. [L. S.]

Witnesses:
THERON L. RICE,
SISLEY PETERSON.

Copies of this patent may be obtained for five cents each, by addressing the "Commissioner of Patents, Washington, D. C."